United States Patent
Kaneyoshi

(10) Patent No.: US 7,314,581 B2
(45) Date of Patent: Jan. 1, 2008

(54) RARE EARTH PHOSPHATE AND MAKING METHOD

(75) Inventor: Masami Kaneyoshi, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 308 days.

(21) Appl. No.: 11/099,597

(22) Filed: Apr. 6, 2005

(65) Prior Publication Data

US 2005/0226799 A1    Oct. 13, 2005

(30) Foreign Application Priority Data

Apr. 8, 2004   (JP)   ............................... 2004-113755

(51) Int. Cl.
   *C09K 11/81* (2006.01)
(52) U.S. Cl. ................. 252/301.4 P; 423/263
(58) Field of Classification Search ......... 252/301.4 P; 423/263
   See application file for complete search history.

(56) References Cited

U.S. PATENT DOCUMENTS

| | | |
|---|---|---|
| 57,400 A | 8/1866 | Spear et al. |
| 3,905,912 A | 9/1975 | Mathers |
| 5,340,556 A * | 8/1994 | Collin et al. ................ 423/263 |
| 5,470,503 A | 11/1995 | Braconnier |
| 5,961,882 A * | 10/1999 | Huguenin ............. 252/301.4 P |
| 6,419,852 B1 * | 7/2002 | Braconnier et al. ... 252/301.4 P |

FOREIGN PATENT DOCUMENTS

| | | |
|---|---|---|
| EP | 0 376 339 A1 | 7/1990 |
| EP | 0 581 621 A1 | 2/1994 |
| EP | 0 829 454 A1 | 3/1998 |
| JP | 06-017049 | 1/1994 |

OTHER PUBLICATIONS

Boldu et al, "EPR and thermoluminescence investigations of Mn2+ in LuPO4, YPO4, and ScPO4", J. Chem. Phys. 83(12), Dec. 1985, pp. 6113-6120.*

European Search Report dated Aug. 4, 2006, issued in corresponding European Application No. 05252203.4.

Phosphor Handbook, Ohm Co., Ltd., 1987, pp. 105-108. (Cited in the specification).

Y. Miyajima et al. "*Solubility Range and Ionic Conductivity of Large Trivalent Ion Doped $Na_{1+x}M_xZr_{2-x}P_3O_{12}$ (M: In, Yb, Er, Y, Dy, Tb, Gd) Solid Electrolytes.*" Solid State Ionics, vol. 124, 1999, pp. 201-211, XP002391300.

M.A. Talbi et al. "The New Phosphates $Ln_{1/3}Zr_2(PO_4)_3$ ($Ln=$ Rare Earth)." Journal of Solid State Chemistry, vol. 110, 1994, pp. 350-355, XP002391299.

K.N. Kim et al. "*High Luminance of Green Emitting Phosphor, $Mg_2SnO_4$:Mn.*" Journal of Luminescence, vol. 99, 2002, pp. 169-173.

* cited by examiner

*Primary Examiner*—C. Melissa Koslow
(74) *Attorney, Agent, or Firm*—Westerman, Hattori, Daniels & Adrian, LLP.

(57) ABSTRACT

A rare earth phosphate represented by the formula: $RPO_4$ wherein R is a rare earth element selected from Sc, Y, and lanthanoids of atomic numbers 57 to 71, wherein Mn substitutes for 0.01-15 atom % of R emits blue light when excited by vacuum-UV radiation.

10 Claims, 1 Drawing Sheet

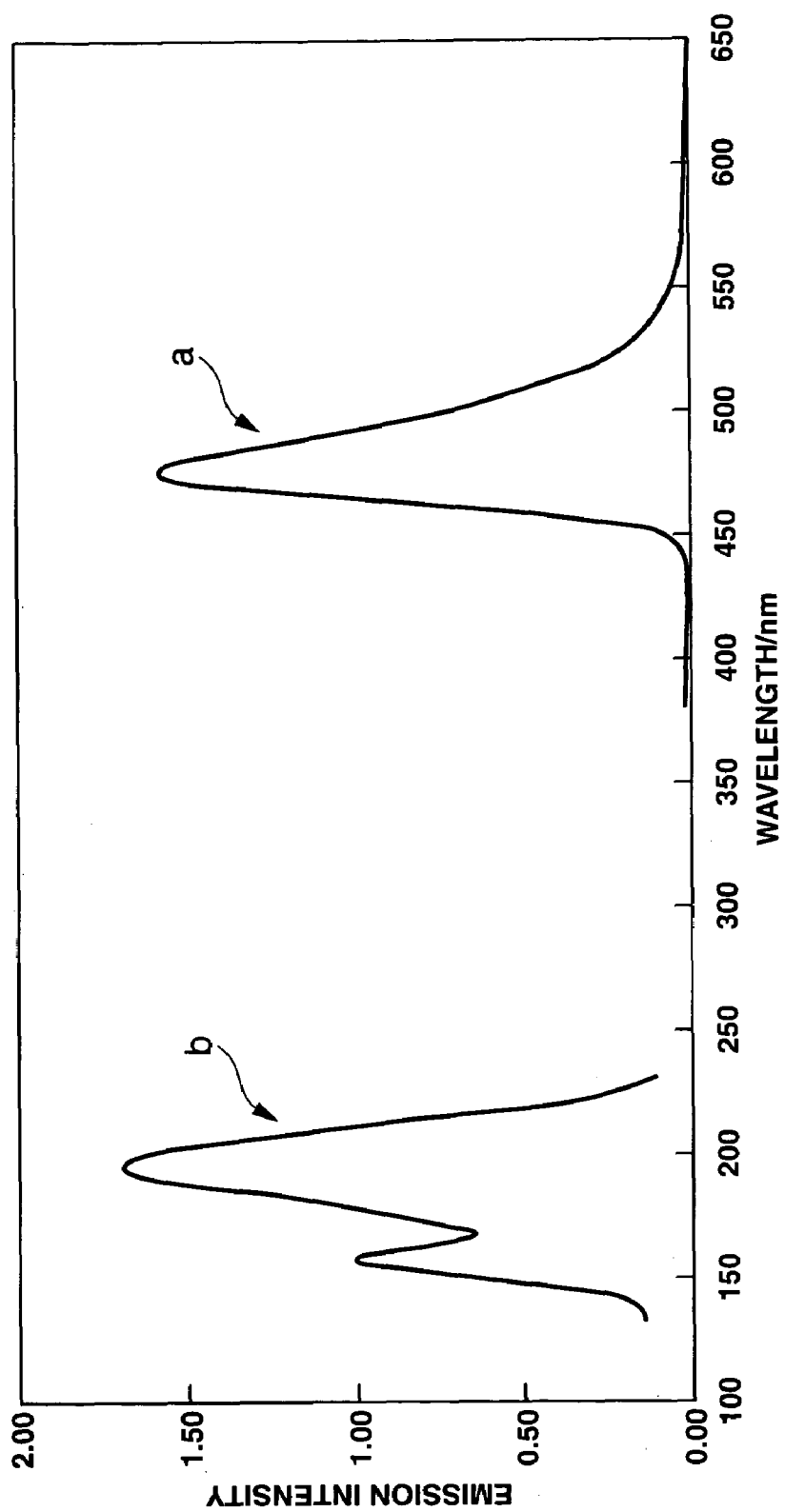

RARE EARTH PHOSPHATE AND MAKING METHOD

CROSS-REFERENCE TO RELATED APPLICATION

This non-provisional application claims priority under 35 U.S.C. §119(a) on Patent Application No. 2004-113755 filed in Japan on Apr. 8, 2004, the entire contents of which are hereby incorporated by reference.

TECHNICAL FIELD

This invention relates to a rare earth phosphate composition having characteristic luminescence and a method for preparing the same.

BACKGROUND ART

Rare earth phosphates, especially orthophosphates represented by the compositional formula: $RPO_4$ wherein R is a rare earth element selected from scandium, yttrium, and lanthanoids of atomic numbers 57 to 71, are known as host crystals for commercial phosphors, as typified by $LaPO_4$:$Ce^{3+}$, $Tb^{3+}$ (see "Phosphor Handbook," Ohm Co., Ltd., 1987, p. 218). So far, the additive element attributable to emission was limited to Ce, Tb, and Eu among other rare earth elements.

Manganese is often used as an activator or dopant to phosphors. The emission of manganese dopant has a peak wavelength almost in the range of 550 to 700 nm which corresponds to yellow to red color. Known materials capable of luminescence of shorter wavelength include calcium fluoride with Mn solid solution, i.e., $CaF_2$:$Mn^{2+}$ that exhibits a peak wavelength 495 nm, and oxides such as $Zn_2SiO_4$:$Mn^{2+}$ that exhibits a peak wavelength 525 nm and $ZnGa_2O_4$:$Mn^{2+}$ that exhibits a peak wavelength 510 nm (see "Phosphor Handbook," Ohm Co., Ltd., 1987, pp. 105-108, 231), and $Mg_2SnO_4$:Mn that exhibits a peak wavelength 500 nm (see Journal of Luminescence, Elsevier Science, 2002, Vol. 99, pp. 169-173).

SUMMARY OF THE INVENTION

An object of the invention is to provide a rare earth phosphate composition which emits blue light when excited by radiation in the vacuum-UV region, and a method for preparing the same.

The inventors have found that a rare earth phosphate represented by the compositional formula: $RPO_4$ wherein R is a rare earth element selected from scandium, yttrium, and lanthanoids of atomic numbers 57 to 71, becomes a useful phosphor when manganese substitutes for 0.01 atom % to 15 atom % of R, and preferably, zirconium or hafnium further substitutes for up to 15 atom % of R to form a solid solution. This composition emits blue light having a peak wavelength of about 480 nm when excited by radiation in the vacuum-UV region.

In one aspect, the invention provides a rare earth phosphate composition represented by the compositional formula: $RPO_4$ wherein R is a rare earth element selected from scandium, yttrium, and lanthanoids of atomic numbers 57 to 71, wherein manganese substitutes for 0.01 atom % to 15 atom % of R, and preferably, zirconium and/or hafnium further substitutes for up to 15 atom % of R. Preferably at least 80 atom % of the unsubstituted portion of R is yttrium or lutetium. The ratio of the number of phosphorus atoms to the total number of metal atoms is typically from 0.8 to 1.25.

In a second aspect, the invention provides a method for preparing a rare earth phosphate composition, comprising the steps of mixing a rare earth phosphate represented by the compositional formula: $RPO_4$ wherein R is a rare earth element selected from scandium, yttrium, and lanthanoids of atomic numbers 57 to 71, with a manganese-containing salt or compound and optionally a zirconium and/or hafnium-containing salt or compound, and heating the mixture at a temperature of 600° C. to 1,600° C. for reaction.

In a preferred embodiment, the rare earth phosphate represented by the formula: $RPO_4$ has been prepared by reacting a water-soluble salt of the rare earth R with phosphoric acid or a water-soluble phosphate in aqueous solution for forming a precipitate, and drying or firing the precipitate at a temperature in a range from room temperature to 1,000° C. for removing water. Also preferably, the manganese-containing salt or compound is a manganese-containing oxide, carbonate, oxalate, phosphate, hydrogenphosphate, chloride or fluoride; and the zirconium or hafnium-containing salt or compound is a zirconium or hafnium-containing oxide, carbonate, oxalate, phosphate, hydrogenphosphate, chloride, oxychloride or fluoride.

In a further preferred embodiment, the mixing step includes further adding diammonium hydrogenphosphate, ammonium dihydrogenphosphate, triammonium phosphate or phosphoric acid. The heating step is desirably conducted in an atmosphere of argon, nitrogen, or argon or nitrogen containing up to 20% by volume of hydrogen.

In a third aspect, the invention provides a method for preparing a rare earth phosphate composition, comprising the steps of mixing solutions of water-soluble salts or compounds containing a rare earth element R, manganese, and optionally zirconium and/or hafnium with a solution of phosphoric acid or a water-soluble phosphate, for forming a precipitate, wherein R is a rare earth element selected from scandium, yttrium, and lanthanoids of atomic numbers 57 to 71; drying or firing the precipitate for removing water; and heating at a temperature of 600° C. to 1,600° C. for reaction, desirably in an atmosphere of argon, nitrogen, or argon or nitrogen containing up to 20% by volume of hydrogen.

The manganese-substituted rare earth phosphate compositions of the invention produce blue luminescence without a need for expensive europium or poisonous antimony and will find widespread use as phosphors.

BRIEF DESCRIPTION OF THE DRAWING

FIG. 1 is a chart illustrating the spectrum (b) of exciting radiation having a peak at 185 nm and the spectrum (a) of emission having a peak at 477.2 nm from Sample No. 1 in Example 1.

DESCRIPTION OF THE PREFERRED EMBODIMENTS

The rare earth phosphate composition of the invention is based on a phosphate represented by the compositional formula: $RPO_4$ wherein R is a rare earth element selected from scandium (Sc), yttrium (Y), and lanthanoids of atomic numbers 57 to 71, wherein 0.01 atom % to 15 atom % of R is substituted with manganese (Mn).

R is a rare earth element selected from Sc, Y, and lanthanoids of atomic numbers 57 to 71, and simply referred to as rare earth R, hereinafter. Such rare earth elements may be used alone or in combination of two or more. Of these elements, yttrium (Y) and lutetium (Lu) are preferred because they are free of any emission-interfering absorption and allow for substitution with Mn or Zr.

According to the invention, Mn substitutes for 0.01 atom % to 15 atom %, preferably 0.1 atom % to 10 atom % of the rare earth R in the phosphate of the above formula. With a degree of substitution of less than 0.01 atom %, no substantial luminescence is observable. If the degree of substitution is more than 15 atom %, such an excess of Mn does not effectively substitute or form a solid solution in the crystal, but inconveniently forms different chemical species to interfere with emission.

To increase the emission intensity, it is preferred that in addition to Mn, zirconium (Zr) and/or hafnium (Hf) further substitutes for up to 15 atom %, preferably up to 10 atom % of the rare earth R. A degree of substitution of more than 15 atom % may cause formation of odd chemical species as in the case of excess Mn substitution or alter the crystalline structure. Zirconium is preferred because of richer resources and lower costs. The total degree of substitution with Mn, Zr and Hf is preferably up to 30 atom %.

It is desired for the rare earth phosphate composition of the invention that at least 80 atom %, especially at least 90 atom % of the unsubstituted portion of the rare earth R be yttrium (Y) or lutetium (Lu). The unsubstituted portion refers to the rare earth element that is left after substitution with Mn, Zr and Hf.

Also, the ratio of the number of phosphorus atoms to the total number of metal atoms (inclusive of the substituent elements), represented as P/R, is preferably from 0.8 to 1.25 and more preferably from 0.9 to 1.15. If P/R is less than 0.8 or more than 1.25, a phase different from the orthophosphate may form in such a proportion as to interfere with emission. The ratio P/R can be determined by chemical analysis, for example, by disintegrating a sample, dissolving into a solution, and quantifying rare earth elements, phosphorus and other elements by ICP emission spectrometry.

Now the method of preparing the rare earth phosphate composition is described. A first method for preparing a rare earth phosphate composition involves the steps of adding to a rare earth phosphate represented by the compositional formula: $RPO_4$ wherein R is as defined above (i.e., phosphate of only rare earth element, free of Mn, Zr and Hf), manganese in salt or compound form and optionally zirconium and/or hafnium in salt or compound form so as to give a predetermined composition, and heating the mixture for reaction at a temperature of 600° C. to 1,600° C., preferably 700° C. to 1,400° C. for a time of 30 minutes to 24 hours, preferably 1 hour to 8 hours. Below these conditions, unreacted portions may be left. Beyond these conditions, the reaction product can be sintered so that it becomes difficult to disintegrate.

The rare earth phosphate used in the first method is preferably prepared by reacting a water-soluble salt of the rare earth R with phosphoric acid or a water-soluble phosphate in aqueous solution for forming a precipitate, and drying or firing the precipitate at a temperature in a range from room temperature (25° C.) to 1,000° C. for removing water. The salt prepared in this way is fully reactive and allows for diffusion and substitution of Mn and the like.

The material used for substituting Mn for the rare earth R, that is, the Mn-containing salt or compound is typically a Mn-containing oxide, carbonate, oxalate, phosphate, hydrogenphosphate, chloride or fluoride. The amount of the Mn-containing salt or compound used is determined so that the amount of Mn may correspond to the target composition.

The material used for substituting Zr or Hf for the rare earth R, that is, the Zr or Hf-containing salt or compound is typically a Zr or Hf-containing oxide, carbonate, oxalate, phosphate, hydrogenphosphate, chloride, oxychloride or fluoride. The amount of the Zr or Hf-containing salt or compound used is determined so that the amount of Zr or Hf may correspond to the target composition.

Phosphoric acid or a phosphate may be added to make up an amount of phosphorus that corresponds to a heat loss through volatilization and accommodates Mn or the like. A flux may also be added for accelerating the reaction. Preferred examples of phosphoric acid or phosphates added as the phosphorus make-up include phosphoric acid, diammonium hydrogenphosphate, ammonium dihydrogenphosphate, and triammonium phosphate because they introduce no extra elements. Suitable fluxes are alkali metal fluorides and boric acid. The flux is preferably used in an amount of up to 30% by weight of the entire mixture.

When the above components are mixed, the mixing technique is not particularly limited. A mortar, fluidized mixer or inclined rotary drum mixer may be used.

The atmosphere in which the mixture is heated for reaction may be selected from argon, nitrogen, and argon or nitrogen containing up to 20% by volume of hydrogen, preferably more than 0% by volume to 4% by volume of hydrogen. Oxygen-containing atmospheres as typified by air should be avoided because Mn can otherwise be oxidized to an oxidization number of 3 or more so that it contributes little to emissions and the salt is colored and becomes absorptive to emissions. The presence of excessive hydrogen poses a safety problem and can cause oxygen defects.

A second method for preparing a rare earth phosphate composition involves the steps of furnishing rare earth R, Mn, and optionally Zr and/or Hf in water-soluble salt or compound form, mixing the salts or compounds in solution form so as to give a predetermined composition, reacting the solution with a solution of phosphoric acid or a water-soluble phosphate for forming a precipitate, and drying or firing the precipitate for removing water.

The precipitate resulting from the reaction may also be separated by filtration or centrifugation, optionally washed with water, and dried or fired at a temperature from room temperature (25° C.) to 1,000° C. for removing water.

To ensure diffusion and solid-solution formation of substituent elements, as in the first method, the dried product is desirably heated for reaction at a temperature of 600° C. to 1,600° C., preferably 700° C. to 1,400° C. for a time of 30 minutes to 24 hours, preferably 1 hour to 8 hours. At this point, phosphoric acid or a phosphate may optionally be added to make up an amount of phosphorus that corresponds to a heat loss through volatilization, and a flux may also be added for accelerating the reaction.

Suitable water-soluble salts or compounds containing metal elements, rare earth R, Mn, Zr and Hf include chlorides, nitrates, sulfates and oxychlorides containing such metal elements. The water-soluble phosphates which can be used herein include diammonium hydrogenphosphate, ammonium dihydrogenphosphate, triammonium phosphate, and sodium hydrogenphosphate.

In the second method, the concentrations of the solutions and the temperature of admixing reaction or precipitate formation are not particularly limited. Appropriate values may be selected for a particular type of reaction.

The atmosphere in which the reaction is carried out may be selected from argon, nitrogen, and argon or nitrogen containing up to 20% by volume of hydrogen, preferably more than 0% by volume to 4% by volume of hydrogen, as in the first method.

EXAMPLE

Synthesis Examples and Examples of the invention are given below by way of illustration and not by way of limitation.

Preliminary Synthesis Example

Preparation of Rare Earth Phosphate and Manganese Oxalate

Rare Earth Phosphate

A 5-L beaker was charged with 65.3 g of commercial 75% phosphoric acid (containing 0.5 mol of $H_3PO_4$) and 4,650 cm$^3$ of deionized water. The solution was stirred while heating at 70-80° C. on a water bath. With stirring, 300 cm$^3$ of rare earth solution 1, 2 or 3 (containing 0.833 mol/dm$^3$ of rare earth element) was poured into the solution.

Solution 1: $YCl_3$ aqueous solution
Solution 2: $Lu(NO_3)_3$ aqueous solution
Solution 3: $Gd(NO_3)_3$ aqueous solution The mixture was stirred for 10 minutes. The resulting precipitate was filtered through a Buchner funnel and washed with water. The thus recovered product was fired in air at 900° C. There were obtained $YPO_4$ (Phosphate 1), $LuPO_4$ (Phosphate 2), and $GdPO_4$ (Phosphate 3).

$YPO_4$ (Phosphate 1) was analyzed by ICP emission spectrometry, finding a P/Y value of 1.13.

Manganese Oxalate 79.16 g of manganese chloride (laboratory reagent $MnCl_2.4H_2O$) was added to 160 cm$^3$ of deionized water and dissolved therein. Separately, 800 cm$^3$ of a solution of 68.21 g of ammonium oxalate (guaranteed reagent) in deionized water was stirred while heating at about 50° C. on a water bath. The manganese chloride solution was poured into the ammonium oxalate solution, followed by 10 minutes of stirring. The resulting precipitate was filtered and washed with water. The thus recovered product was dried in an air blow dryer at 105° C., obtaining manganese oxalate ($MnC_2O_4$).

Synthesis Examples 1 to 3

Preparation of Rare Earth Phosphate Compositions by Solid Mixing Method

Phosphates 1 to 3 (the rare earth phosphates obtained in Preliminary Synthesis Example) were combined with $MnC_2O_4$ and other components to form Mixes 1 to 3 which were mixed on an automated mortar and placed in an alumina crucible.

Mixes 1 to 3 were heated to 1,200° C. in an electric furnace through which nitrogen gas flowed at 0.5 to 1.0 dm$^3$/min (calculated in the standard state). The Mixes were held at the temperature for 3 hours, and then cooled in the nitrogen stream. The fired products were disintegrated on a mortar into powders, designated Sample Nos. 1 to 3.

Synthesis Example 4

Preparation of Rare Earth Phosphate Compositions by Co-precipitation Method To 125 cm$^3$ of a $YCl_3$ solution having a Y concentration of 1.95 mol/dm$^3$ was added 1.24 g of manganese chloride (laboratory reagent $MnCl_2.4H_2O$). Water was added to the mixture which was stirred until complete dissolution, reaching a total volume of 300 cm$^3$.

Separately, a 5-L beaker was charged with 65.3 g of commercial 75% phosphoric acid (containing 0.5 mol of $H_3PO_4$) and 4,650 cm$^3$ of deionized water. The solution was stirred while heating at 70-80° C. on a water bath. With stirring, the preformed Y/Mn solution was poured into the solution. The mixture was stirred for 10 minutes. The resulting precipitate was filtered through a Buchner funnel and washed with water. The thus recovered product was fired in air at 900° C.

The fired product was moderately disintegrated on a mortar into a powder. The powder was placed in an alumina crucible and heated to 1,200° C. in an electric furnace through which nitrogen gas flowed at 0.6 dm$^3$/min (calculated in the standard state). It was held at the temperature for 3 hours, and then cooled in the nitrogen stream. The product was disintegrated on a mortar into a powder, designated Sample No. 4.

Synthesis Example 5

Preparation of Rare Earth Phosphate Compositions by Co-precipitation Method To 48.9 cm$^3$ of a $YCl_3$ solution having a Y concentration of 1.95 mol/dm$^3$ were added 0.495 g of manganese chloride (laboratory reagent $MnCl_2.4H_2O$) and 0.806 g of zirconium oxychloride (guaranteed reagent $ZrOCl_2.8H_2O$). Water was added to the mixture which was stirred until complete dissolution, reaching a total volume of 100 cm$^3$.

Separately, 15.85 g of $(NH_4)_2HPO_4$ (guaranteed reagent) was dissolved in 290 cm$^3$ of deionized water while stirring at room temperature. With stirring, the preformed Y/Mn/Zr solution was poured into the solution. Aqueous ammonia was added dropwise and little by little to the slurry while monitoring the pH thereof. The slurry was eventually adjusted to pH 4.8, which required about 7 cm$^3$ of aqueous ammonia.

TABLE 1

| Synthesis Example 1 | Mix 1 | $YPO_4$ 17.47 g | | $MnC_2O_4$ 0.388 g | $ZrO_2$[1] 0.308 g | $(NH_4)_2HPO_4$[2] 0.660 g |
|---|---|---|---|---|---|---|
| Synthesis Example 2 | Mix 2 | $LuPO_4$ 12.82 g | | $MnC_2O_4$ 0.194 g | $ZrO_2$ 0.154 g | $(NH_4)_2HPO_4$ 0.330 g |
| Synthesis Example 3 | Mix 3 | $YPO_4$ 16.09 g | $GdPO_4$ 2.52 g | $MnC_2O_4$ 0.395 g | | $(NH_4)_2HPO_4$ 0.330 g |

[1] TZ-0 by Tosoh Corp.
[2] guaranteed reagent

The mixture was stirred for a further 10 minutes. The resulting precipitate was filtered through a Buchner funnel and washed with water. The thus recovered product was dried in a vacuum dryer at 160° C. The product was moderately disintegrated on a mortar into a powder. The powder was placed in an alumina crucible and heated to 1,200° C. in an electric furnace through which nitrogen gas flowed at 0.7 dm$^3$/min (calculated in the standard state). It was held at the temperature for 3 hours, and then cooled in the nitrogen stream. The product was disintegrated on a mortar into a powder, designated Sample No. 5.

Examples 1 to 5

Measurement of Luminescence Spectrum

Using a vacuum-UV region absorption/luminescence spectrometer (Bunkoh Keiki Co., Ltd.), the luminescence spectra of Sample Nos. 1 to 5 when excited by radiation of 185 nm were measured, with the results shown in Table 2. FIG. 1 illustrates the exciting spectrum (b) and the luminescence spectrum (a) of Sample No. 1 in Example 1.

is a rare earth element selected from scandium, yttrium, and lanthanoids of atomic numbers 57 to 71, with a manganese-containing salt or compound and optionally a zirconium and/or hafnium-containing salt or compound, and heating the mixture at a temperature of 600° C. to 1,600° C. for reaction.

5. The method of claim 4, wherein the rare earth phosphate represented by the formula: $RPO_4$ has been prepared by reacting a water-soluble salt of the rare earth R with phosphoric acid or a water-soluble phosphate in aqueous solution for forming a precipitate, and drying or firing the precipitate at a temperature in a range from room temperature to 1,000° C. for removing water.

6. The method of claim 4, wherein the manganese-containing salt or compound is a manganese-containing oxide, carbonate, oxalate, phosphate, hydrogenphosphate, chloride or fluoride.

7. The method of claim 4, wherein the zirconium or hafnium-containing salt or compound is a zirconium or hafnium-containing oxide, carbonate, oxalate, phosphate, hydrogenphosphate, chloride, oxychloride or fluoride.

TABLE 2

| Sample No. | | Mn substitution (at %) | Zr substitution (at %) | Peak wavelength (nm) | Peak height | Half bandwidth* (nm) |
|---|---|---|---|---|---|---|
| Example 1 | #1 $YPO_4$:Mn, Zr | 2.5 | 2.5 | 477.2 | 1.58 | 35.8 |
| Example 2 | #2 $LuPO_4$:Mn, Zr | 2.5 | 2.5 | 489.2 | 2.03 | 37.4 |
| Example 3 | #3 $(Y, Gd)PO_4$:Mn | 2.5 | — | 476.0 | 0.132 | 33.3 |
| Example 4 | #4 $YPO_4$:Mn | 2.5 | — | 478.2 | 0.109 | 34.6 |
| Example 5 | #5 $YPO_4$:Mn, Zr | 2.5 | 2.5 | 478.0 | 1.70 | 35.9 |

*full width of a peak distribution measured at half the maximum emission intensity Japanese Patent Application No. 2004-113755 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A rare earth phosphate composition represented by the compositional formula: $RPO_4$ wherein R is a rare earth element selected from scandium, yttrium, and lanthanoids of atomic numbers 57 to 71, wherein manganese substitutes for 0.01 atom % to 15 atom % of R, and
wherein zirconium and/or hafnium further substitutes for up to 15 atom % of R.

2. The rare earth phosphate composition of claim 1, wherein at least 80 atom % of the unsubstituted portion of R is yttrium or lutetium.

3. The rare earth phosphate composition of claim 1, wherein the ratio of the number of phosphorus atoms to the total number of metal atoms is from 0.8 to 1.25.

4. A method for preparing a rare earth phosphate composition, comprising the steps of mixing a rare earth phosphate represented by the compositional formula: $RPO_4$ wherein R 8. The method of claim 4, wherein the mixing step includes further adding diammonium hydrogenphosphate, ammonium dihydrogenphosphate, triammonium phosphate or phosphoric acid.

9. The method of claim 4, wherein the heating step is conducted in an atmosphere of argon, nitrogen, or argon or nitrogen containing up to 20% by volume of hydrogen.

10. A method for preparing a rare earth phosphate composition, comprising the steps of
mixing solutions of water-soluble salts or compounds containing a rare earth element R, manganese, and optionally zirconium and/or hafnium with a solution of phosphoric acid or a water-soluble phosphate, for forming a precipitate, wherein R is a rare earth element selected from scandium, yttrium, and lanthanoids of atomic numbers 57 to 71,
drying or firing the precipitate for removing water, and
heating at a temperature of 600° C. to 1,600° C. for reaction,
wherein the heating step is conducted in an atmosphere of argon, nitrogen, or argon or nitrogen containing up to 20% by volume of hydrogen.

* * * * *